United States Patent [19]

Graham

[11] 4,214,715
[45] Jul. 29, 1980

[54] ROTARY FOOD CUTTING APPARATUS

[75] Inventor: Elwood M. Graham, Ocean Springs, Miss.

[73] Assignee: M. H. Graham Corporation, Biloxi, Miss.

[21] Appl. No.: 933,684

[22] Filed: Aug. 15, 1978

[51] Int. Cl.² ............................................. B02C 18/18
[52] U.S. Cl. .................................... 241/93; 241/273.1
[58] Field of Search ..................... 83/331, 332, 356.3, 83/607; 144/174, 180; 241/93, 94, 286, 277, 280, 285 R, 285 A, 85, 101.1, 273.1, 273.3

[56] References Cited

U.S. PATENT DOCUMENTS 2,713,367  7/1955  Aberer .......................... 241/285 R X

FOREIGN PATENT DOCUMENTS 703956  2/1954  United Kingdom .................... 241/277

Primary Examiner—Mark Rosenbaum
Attorney, Agent, or Firm—Beveridge, DeGrandi, Kline & Lunsford

[57] ABSTRACT

Food in a hopper is sliced or shredded by a conical cutter which rotates adjacent to the lower edge of the hopper. A set of interchangeable cutters are provided for producing products of different shapes. Such cutters have conical walls of differing conical diameters and cutting portions which project different distances from the walls so that the cutting edges of the cutters in the set all lie substantially the same distances from their cutter axes and from the lower edge of the hopper.

4 Claims, 6 Drawing Figures

ROTARY FOOD CUTTING APPARATUS

BACKGROUND AND SUMMARY

This invention relates to rotary food cutters in which interchangeable conical cutters comminute and release food from a hopper. Such cutters have cutting portions projecting outwardly from the conical wall of the cutter body to provide sharp forwardly-facing cutting edges and forwardly-facing openings for receiving the cut material. To provide products of different thicknesses, the cutting edges of different cutters extend different heights from the cone walls. Known cutters have their cutting edges shaped to cut the food into a variety of forms such as flat slices, waffled slices, shreds, strings or French fries.

Prior to this invention, the conical walls of the different interchangeable cutters were geometrically identical so that the cutting edges of different cutters would lie at different radial distances from their respective cutter axes. These radii were dependent upon the height of the cutting edges from their respective bases. With such an arrangement, the distances from the cutting edges to the lower edge of the hopper would vary from one cutter to another, sometimes providing an unnecessarily wide gap.

According to the present invention, the cutting edges of all cutters are spaced equidistantly of the cutter axis and the lower edge of the hopper. This effect is achieved by having cutter cones with walls of differing corresponding radii and cutting portions extending different distances from their respective walls, the cutting portions of such cones lying at substantially the same distances from their respective central axes so as to lie substantially the same distance from the lower edge of the hopper.

DESCRIPTION OF A PREFERRED EMBODIMENT

Figure 1:
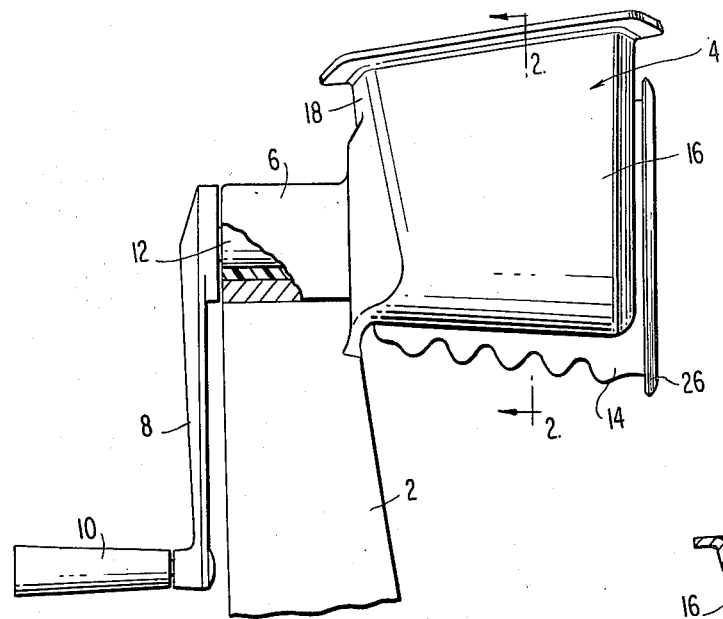
FIG. 1 is a broken elevational view, partially in section, of a rotary food cutting apparatus to which the invention is applicable.
Figure 2:
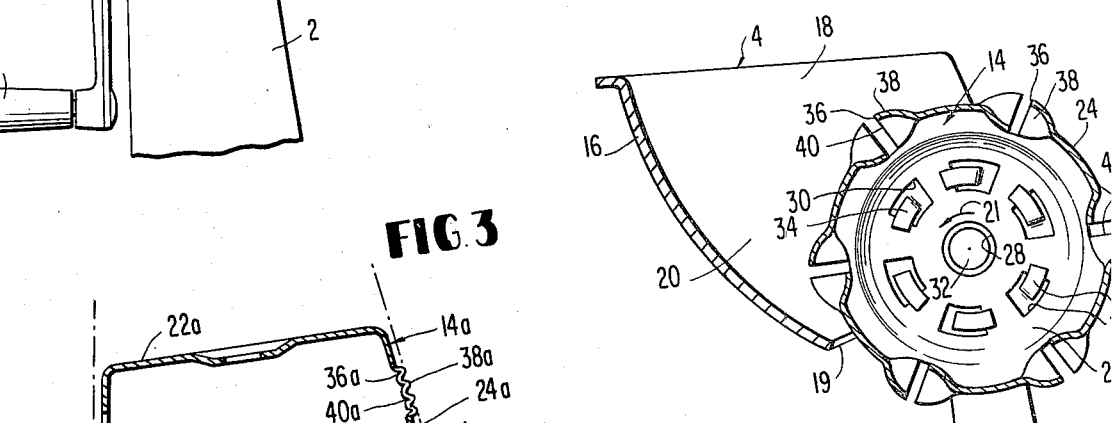
FIG. 2 is a side view of the apparatus of FIG. 1.
Figure 3:
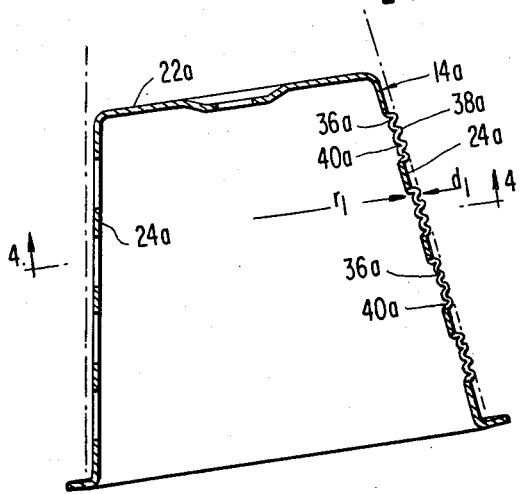
FIGS. 3 and 4 are sectional views of a first cutter cone as seen transversely and longitudinally.
Figure 4:
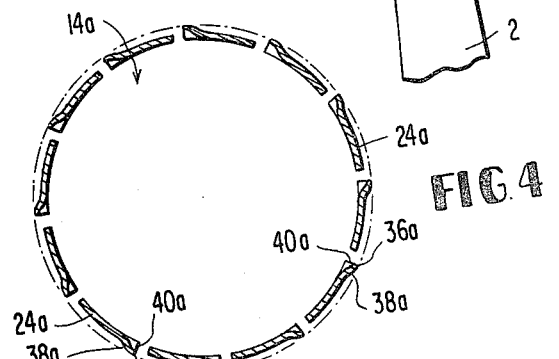

As shown in FIGS. 1 and 2, the food cutter has an upright post 2 which supports a hopper 4 and a bearing 6. A crank 8 with a handle 10 is connected to a spindle 12 which is rotatable in the bearing 6. A mounting plate at the opposite end of the spindle engages and supports a cutter cone 14, so that rotation of the crank 8 will rotate the cutter cone.

The hopper 4 includes an end wall 16 and a curved sidewall 18 with a lower edge 19 which lies close to the cutter cone at a lower height than the rotational axis of spindle 12. FIG. 2 shows a space 20 for receiving the material which is to be comminuted by the cutter cone 14, this space being formed by the cutter cone and the hopper walls 16 ad 18. Foods such as eggs, potatoes, cabbage, carrots and crackers positioned in this space 20 will be cut when the crank 8 is turned in the forward direction of arrow 21 to rotate the cutter 14.

The cutter cone 14 is generally cup-shaped, having a generally flat base 22 and a conical wall portion 24 which terminates in an annular rim 26. The base 22 has a central hole 28 and a set of circumferentially spaced holes 30 which are respectively engaged by a center pin 32 and flat tabs 34 of the mounting plate of spindle 12 as shown in FIG. 2. The tabs 34 extend through holes 30 and are inclined slightly relative to the mounting plate so that, when engaged, they bias and hold the external face of base 22 against the mounting plate in a known manner. The cutter cone 14 is easily detached from the spindle by turning the cone 14 in a reverse direction relative to the mounting plate.

Food in the hopper 4 is cut by sharp cutting edges 36 on cutting portions 38 struck outwardly from the conical wall of the cutter cone. Each of these cutting portions 38 provides both a cutting edge 36 and an opening 40, both of which face forwardly in the direction of cutter rotation.

In existing apparatus of this type, different cutter cones have geometrically identical conical walls 24 and cutting portions which extend different distances from the walls, so that the cutting edges 36 of different cones lie at different distances from the central axis of cutter rotation. This creates differing gaps between the cutting edges 36 and the lower edge 19 of the hopper, depending on which cutter cone is being used. To avert this, the present invention results in substantially the same gap, regardless of which cutter cone is being used.

More specifically, the invention calls for a set of interchangeable cutter cones in which different cutter cones have conical wall portions of differing radii at corresponding axial locations, the cutting portions of the smaller radius cones projecting outwardly a greater distance than the cutting portions of the larger radius cones so as to position the cutting edges of all cones at substantially equal distances from their rotational axes. With this relationship, the cutting edges of the different cones will all lie at substantially equal distances from the lower edge of the hopper for optimum comminution.

This inventive structure will be understood from an inspection of FIGS. 3–6 which show, respectively, a cutter cone 14a for producing shredded food and the cutter cone 14 for producing French fries.

the cone 14a has a base 22a and a conical wall 24a provided with outstruck cutting portions 38a which provide the forwardly-facing openings 40a and sharpened cutting edges 36a. The cutting edges are generally sinuous and are spaced at their extremity a distance $d_1$ from the wall 24a. The wall itself has a radius $r_1$ at the illustrated point of measurement.

The sum of measurements $r_1$ and $d_1$ is such that the cutting edges will follow a path which lies proximate to the lower edge 19 of the hopper 4 while in use.

Figure 5:
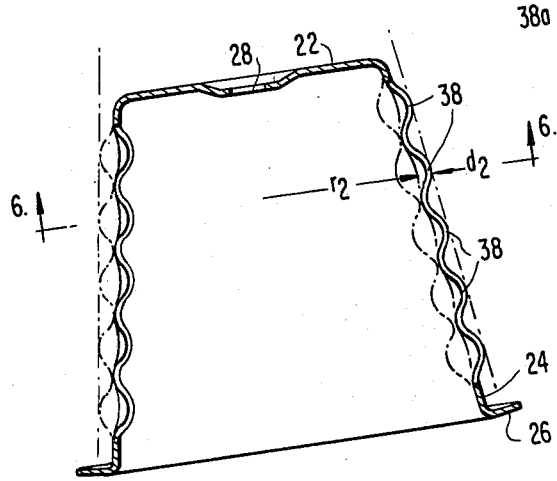
FIGS. 5 and 6 are sectional views of a section cutter cone as seen transversely and longitudinally.
Figure 6:
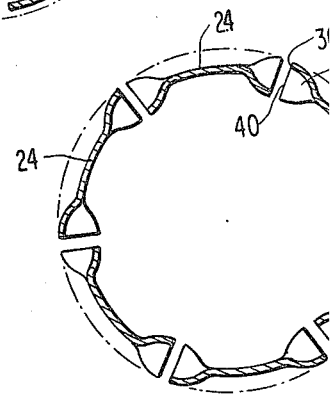

Cone 14 shown in FIGS. 5 and 6 has a wall radius $r_2$ which is less than the radius $r_1$ of cone 14a, these radii being taken at corresponding axial locations on the respective cutter cones. The cutting portions 38 of cone 14 extend from wall 24 a distance $d_2$ which is greater than distance $d_1$. The sum of the measurements $r_2$ and $d_2$ is substantially equal to the sum of $r_1$ and $d_1$ so that the cutting edges of both cones lie at substantially the same distance from their respective central axes and will in use lie at substantially the same distance from the lower edge 19 of hopper 4.

Persons familiar with this art will appreciate that the invention may be practiced by structures which differ in many respects from the illustrated preferred embodiment. An axial spacer connecting the mounting plate to the cutting cone may be used, for example, to change the radii of the cutting cone relative to the hopper. Therefore, it is emphasized that the invention is not limited solely to the disclosed embodiment but is embracing of a variety of structures which fall within the spirit of the following claims.

I claim:

1. A rotary food cutting apparatus comprising,
a hopper for holding food to be cut, said hopper having a lower edge,
a spindle, means for supporting said spindle for rotary movement about an axis which is higher than the lower edge of the hopper, and means on said spindle for supporting a cutter cone at a position which extends adjacent to the lower edge of the hopper,
a set of interchangeable cutter cones each having a conical wall portion which is symmetrical with respect to a central axis, and cutting portions projecting radially outwardly from said conical wall portion, each cutting portion providing a forwardly facing opening and a sharp forwardly facing cutting edge for cutting material in said hopper,
said cutter cones being constructed to provide products of different thicknesses by providing a first said cutter cone having a said wall portion which has radii which are greater than the corresponding radii of the wall portion of a second said cutter cone, said cutting portions of said first cutter cone projecting from their associated wall portion a distance which is less than the corresponding distance by which the cutting portions of said second cutter cone project from their respective conical wall portion, the corresponding said cutting portions of said first and second cutter cones lying at substantially the same distance from their respective central axes so as to lie substantially the same distance from the lower edge of the hopper.

2. The rotary food cutter of claim 1 wherein the means for supporting a cutter cone on the spindle includes a mounting plate having a central pin and a set of tabs, each of said cones having an end wall provided with apertures for receiving said central pin and tabs.

3. The rotary food cutting apparatus of claim 1 wherein the cutting edges of one of said cone are generally sinuous.

4. The rotary food cutter of claim 3 wherein the means for supporting a cutter cone on the spindle includes a mounting plate having a central pin and a set of tabs, each of said cones having an end wall provided with apertures for receiving said central pin and tabs.

* * * * *